United States Patent
Chen et al.

(10) Patent No.: US 9,553,652 B2
(45) Date of Patent: Jan. 24, 2017

(54) COMMUNICATIONS METHOD AND APPARATUS FOR CARRIER AGGREGATION

(71) Applicant: MediaTek Inc., Hsin-Chu (TW)

(72) Inventors: Po-Ying Chen, Hsinchu (TW); Wei-De Wu, Hsinchu (TW); Ping-Hung Chiang, New Taipei (TW); Mao-Ching Chiu, Minxiong Township, Chiayi County (TW)

(73) Assignee: MEDIATEK INC., Hsin-chu (TW)

( * ) Notice: Subject to any disclaimer, the term of this patent is extended or adjusted under 35 U.S.C. 154(b) by 230 days.

(21) Appl. No.: 14/175,250

(22) Filed: Feb. 7, 2014

(65) Prior Publication Data
US 2015/0229383 A1    Aug. 13, 2015

(51) Int. Cl.
*H04W 4/00* (2009.01)
*H04B 7/08* (2006.01)
*H04L 5/00* (2006.01)
*H04B 7/04* (2006.01)
*H04W 28/20* (2009.01)

(52) U.S. Cl.
CPC .......... *H04B 7/0885* (2013.01); *H04B 7/0413* (2013.01); *H04L 5/001* (2013.01); *H04L 5/006* (2013.01); *H04L 5/0023* (2013.01); *H04L 5/0085* (2013.01); *H04W 28/20* (2013.01)

(58) Field of Classification Search
CPC ....... H04B 7/0413; H04B 7/0691; H04B 7/08; H04B 7/0802; H04B 7/0825; H04B 7/0805; H04B 7/0885; H04B 7/0874
See application file for complete search history.

(56) References Cited

U.S. PATENT DOCUMENTS

| | | | | |
|---|---|---|---|---|
| 2008/0075190 A1* | 3/2008 | Lin | ........................ | H04B 7/04 375/267 |
| 2009/0116544 A1* | 5/2009 | Zhang | ................... | H04L 1/0003 375/227 |
| 2009/0124300 A1* | 5/2009 | Park | ..................... | H04B 7/0413 455/574 |
| 2010/0020737 A1* | 1/2010 | Fukumasa | .............. | H04B 7/022 370/312 |
| 2011/0110307 A1* | 5/2011 | Ko | ....................... | H04B 7/0669 370/328 |
| 2011/0261714 A1* | 10/2011 | Pan | ........................ | H04L 5/001 370/252 |
| 2012/0008546 A1* | 1/2012 | Yokoyama | ......... | H04B 7/15542 370/315 |
| 2013/0148600 A1* | 6/2013 | Moulsley | ............... | H04B 7/024 370/329 |
| 2013/0322575 A1* | 12/2013 | Muquet | .................. | H04L 5/001 375/340 |
| 2014/0169317 A1* | 6/2014 | Gao | ..................... | H04B 7/0404 370/329 |

* cited by examiner

*Primary Examiner* — Kan Yuen
(74) *Attorney, Agent, or Firm* — McClure, Qualey & Rodack, LLP (57) ABSTRACT

A communications apparatus and method are provided. The communications method for an apparatus capable of Carrier Aggregation (CA), wherein the apparatus includes a plurality of processing engines and antennas, includes the steps of determining whether the apparatus is configured in a single component carrier for a first group of the antennas; and activating a second group of the antennas if the apparatus is configured in the single component carrier.

17 Claims, 8 Drawing Sheets

COMMUNICATIONS METHOD AND APPARATUS FOR CARRIER AGGREGATION

BACKGROUND OF THE INVENTION

Field of the Invention

The invention generally relates to a communications method and apparatus, and more particularly, to a method to configure additional antennas in single component carrier situation.

Description of the Related Art

Wireless communications systems are widely deployed to provide various telecommunications services such as telephony, video, data, messaging, and broadcast. Typical wireless communications systems may employ multiple-access technologies capable of supporting communications with multiple users by sharing available system resources (e.g., bandwidth, transmitting power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

Carrier Aggregation (CA) improves the data rate of user equipment (UE) by aggregating multiple component carriers for parallel transmission and reception. Carrier aggregation may be enhanced by allowing different Time Division Duplex (TDD) uplink (UL)-downlink (DL) configuration for inter-band carrier aggregation. With such an enhancement, the system can coexist well with the current 3G network and make deployment targeting for different needs easier.

Component carriers may be divided into a primary component carrier (PCC) and a secondary component carrier (SCC). The PCC refers to a carrier that is constantly activated, and the SCC refers to a carrier that may be activated or deactivated according to particular conditions. Activation means that transmission or reception of traffic data may be performed or traffic data is ready for its transmission or reception on the concerned component carrier. Deactivation means that transmission or reception of traffic data is not permitted on the concerned component carrier. The user equipment uses only a single PCC or one or more SCCs along with the PCC.

Figure 1:
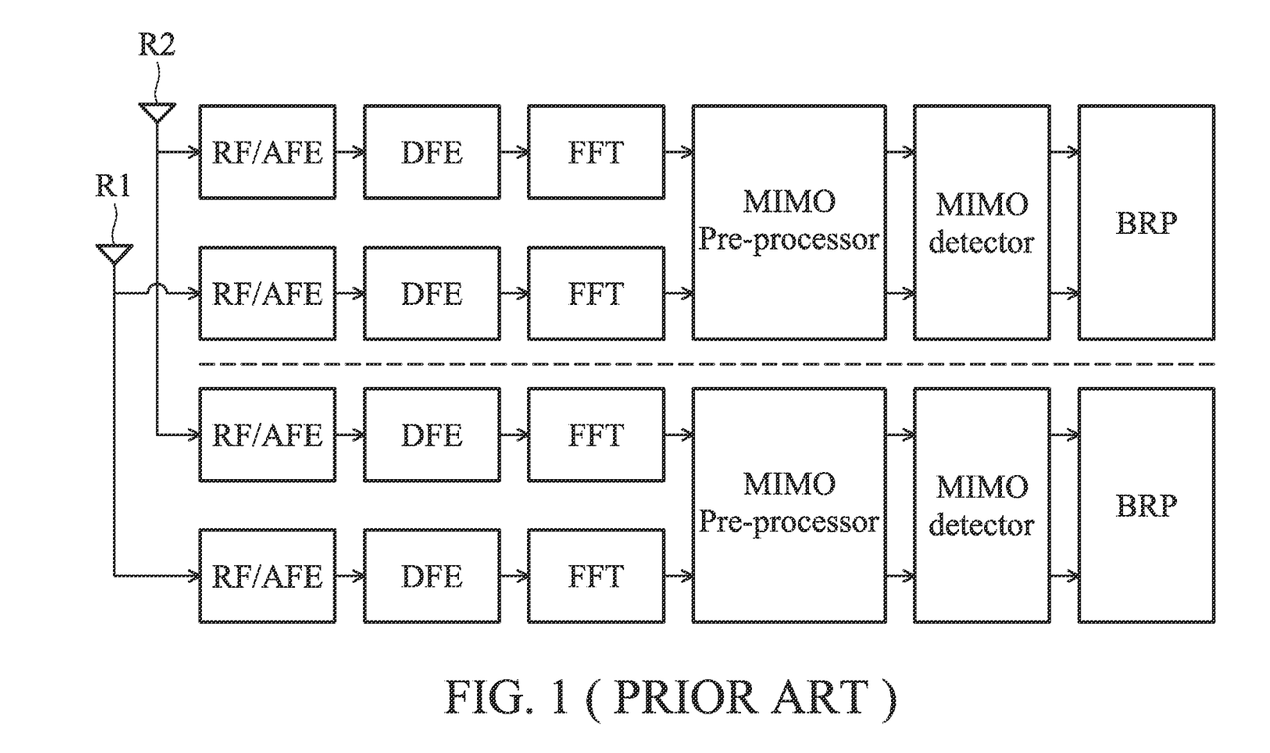
FIG. 1 is a block diagram of a receiver in traditional Carrier Aggregation.

FIG. 1 is a block diagram of a receiver (or user equipment) in traditional Carrier Aggregation (CA). In FIG. 1 the receiver comprises two antennas R1-R2 and a plurality of processing engines such as Radio Frequency (RF)/Analog Front End (AFE) modules, Digital Front End (DFE) modules, Fast Fourier Transform (FFT) modules, Multiple Input Multiple Output (MIMO) Pre-processors, MIMO detectors and Bit Rate Processing (BRP) modules. When the service network provides two component carriers (CCs) for the transmission of Carrier Aggregation, the upper part of processing engines are configured for one component carrier, and the lower part of the processing engines are configured for the other component carrier. However, when the service network only provide single component carrier (e.g. PCC) for the receiver, the processing engines configured for the other component carrier (e.g. SCC) will be in an idle mode. Therefore, the processing engines in the idle mode are not operating efficiently.

BRIEF SUMMARY OF THE INVENTION

A communications method and apparatus are provided to overcome the above mentioned problems.

An embodiment of the invention provides a communications method, for an apparatus capable of Carrier Aggregation (CA), wherein the apparatus comprises a plurality of processing engines and antennas. The communications method comprises the steps of determining whether the apparatus is configured in a single component carrier for a first group of the antennas; and activating a second group of the antennas if the apparatus is configured in the single component carrier.

An embodiment of the invention provides a communications apparatus capable of Carrier Aggregation (CA). The communications apparatus comprises a plurality of processing engines, wherein the processing engines comprised in an RF signal processing device are connected with a plurality of processing antennas, and wherein the antennas are divided into a first group of the antennas and a second group of the antennas; a processor configured to detect whether the communications apparatus is configured in a single component carrier, wherein the processor activates the second group of the antennas if the apparatus is configured in the single component carrier.

Other aspects and features of the invention will become apparent to those with ordinary skill in the art upon review of the following descriptions of specific embodiments of communication transmission methods and systems.

BRIEF DESCRIPTION OF THE DRAWINGS

The invention will become more fully understood by referring to the following detailed description with reference to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 2:
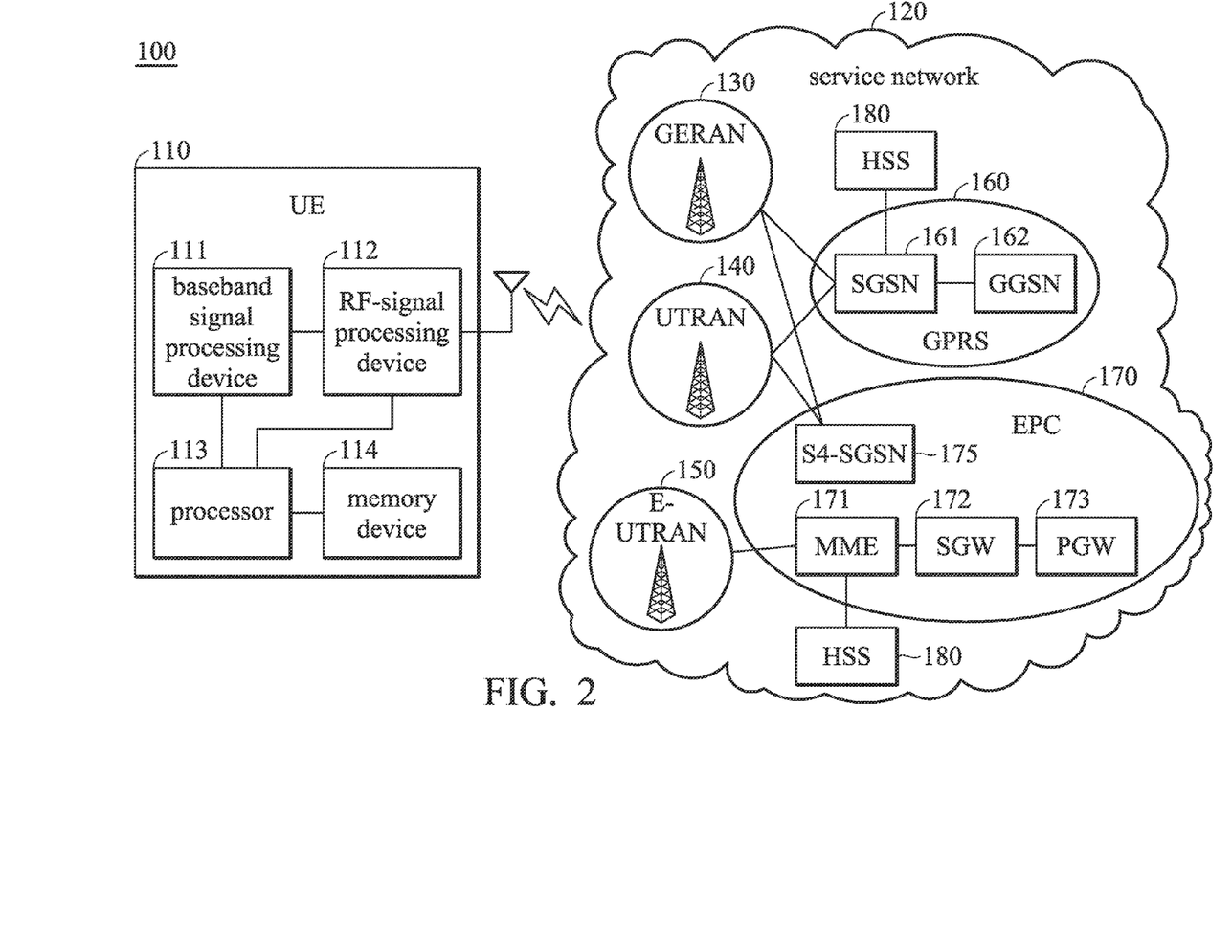
FIG. 2 is a block diagram of a mobile communications system 100 according to an embodiment of the invention.

FIG. 2 is a block diagram of a mobile communications system 100 according to an embodiment of the invention. The system 100 comprises User Equipment (UE) 110, and a service network 120. The UE 110 may be a mobile communications device, such as a cellular phone, a smartphone modem processor, a data card, a laptop stick, a mobile hotspot, an USB modem, a tablet, or others.

The UE 110 may comprise at least a baseband signal processing device 111, a radio frequency (RF) signal processing device 112, a processor 113, a memory device 114, and an antenna module comprising at least one antenna. Note that, in order to clarify the concept of the invention, FIG. 2 presents a simplified block diagram in which only the elements relevant to the invention are shown. However, the invention should not be limited to what is shown in FIG. 2.

The RF signal processing device 112 may receive RF signals via the antenna and process the received RF signals to convert the received RF signals to baseband signals to be processed by the baseband signal processing device 111, or receive baseband signals from the baseband signal processing device 111 and convert the received baseband signals to RF signals to be transmitted to a peer communications apparatus. The RF signal processing device 112 may also comprise an analog front end (AFE) module. The RF signal processing device 112 may comprise a plurality of hardware elements to perform radio frequency conversion. For example, the RF signal processing device 112 may comprise a power amplifier, a mixer, or others.

The baseband signal processing device 111 may further process the baseband signals to obtain information or data transmitted by the peer communications apparatus. The baseband signal processing device 111 may also comprise a plurality of hardware elements to perform baseband signal processing. The baseband signal processing may comprise analog-to-digital conversion (ADC)/digital-to-analog conversion (DAC), gain adjustment, modulation/demodulation, encoding/decoding, and so on. The baseband signal processing device 111 may also comprise a digital front end (DFE) module, a Fast Fourier Transform (FFT) module, a MIMO Pre-processor, a MIMO detector, a bit rate processing (BRP) module. The MIMO Pre-processor may be configured to perform channel estimation (CE), noise estimation (NE), spatial whitening, and so on. The MIMO detector may be configured to perform algorithms such as Maximal Ratio Combining (MRC), Minimum Mean Square Error (MMSE), ML (Maximum Likelihood), and so on. The BRP module is configured to perform de-rate-matching, de-interleaving, decoding, and so on.

The processor 113 may control the operations of the baseband signal processing device 111 and the RF signal processing device 112. According to an embodiment of the invention, the processor 113 may also be arranged to execute the program codes of the software module(s) of the corresponding baseband signal processing device 111 and/or the RF signal processing device 112. The program codes accompanied with specific data in a data structure may also be referred to as a processor logic unit or a stack instance when being executed. Therefore, the processor 113 may be regarded as being comprised of a plurality of processor logic units, each for executing one or more specific functions or tasks of the corresponding software module(s). The memory device 114 may store the software and firmware program codes, system data, user data, etc. of the UE 110. The memory device 114 may be a volatile memory, e.g. a Random Access Memory (RAM), or a non-volatile memory, e.g. a flash memory, Read-Only Memory (ROM), or hard disk, or any combination thereof. In an embodiment of the invention, the memory device 114 stores the system information which the UE 110 collected previously.

According to an embodiment of the invention, the RF signal processing device 112 and the baseband signal processing device 111 may be collectively regarded as a radio module capable of communicating with a wireless network to provide wireless communications services in compliance with a predetermined Radio Access Technology (RAT). Note that, in some embodiments of the invention, the UE 110 may further be extended to comprise more than one antenna and/or more than one radio module, and the invention should not be limited to what is shown in FIG. 2. In the carrier aggregation (CA) technology, the UE 110 may comprise a plurality of processing engines and antennas, wherein the elements comprised in the RF signal processing device 112 and the baseband signal processing device 111 are may be regarded as processing engines. A more detailed description of the UE 110 which is capable of carrier aggregation (CA) is provided in detail below.

In addition, in some embodiments of the invention, the processor 113 may be configured inside of the baseband signal processing device 111, or the UE 110 may comprise another processor configured inside of the baseband signal processing device 111. Thus the invention should not be limited to the architecture shown in FIG. 1.

The service network 120 may comprise a GSM EDGE Radio Access Network (GERAN) 130, a Universal Terrestrial Radio Access Network (UTRAN) 140, an Evolved UTRAN (E-UTRAN) 150, a General Packet Radio Service (GPRS) subsystem 160 and an Evolved Packet Core (EPC) subsystem 170. The GERAN 130, UTRAN 140 and E-UTRAN 150 may be in communications with the GPRS subsystem 160 or the EPC subsystem 170, wherein the GERAN 130, UTRAN 140 and E-UTRAN 150 allow connectivity between the UE 110 and the GPRS subsystem 160 or the EPC subsystem 170 by providing the functionality of wireless transmission and reception to and from the UE 110 for the GPRS subsystem 160 or the EPC subsystem 170, and the GPRS subsystem 160 or the EPC subsystem 170 signals the required operation to the GERAN 130, UTRAN 140 and E-UTRAN 150 for providing wireless services to the UE 110. The GERAN 130, UTRAN 140 and E-UTRAN 150 may contain one or more base stations (or called NodeBs or eNodeBs) and Radio Network Controllers (RNCs). Specifically, the GPRS subsystem 160 includes a Serving GPRS (General Packet Radio Services) Support Node (SGSN) 161 and a Gateway GPRS Support Node (GGSN) 162, wherein the SGSN 161 is the key control node for packet routing and transfer, mobility management (e.g., attach/detach and location management), session management, logical link management, and authentication and charging functions, etc., and the GGSN 162 is responsible for Packet Data Protocol (PDP) address assignments and inter-working with external networks. The EPC subsystem 170 may comprise a Mobility Management Entity (MME) 171, which may be responsible for idle mode UE tracking, paging procedures, and attachment and activation processes. The EPC subsystem 170 may also comprise a Servicing Gateway (SGW) 172, which may be responsible for the routing and forwarding of data packets. The EPC subsystem 170 may also include a Packet data network Gateway (PGW) 173, which may be responsible for providing connectivity from the UE 110 to external networks. Both the SGSN 161 and the MME 171 may be in communications with Home Subscriber Server (HSS) 180 which may provide device identification information, an International Mobile Subscriber Identity (IMSI), etc. It should be appreciated that the EPC subsystem 170 may also comprise a S4-SGSN 175, thereby allowing the GERAN 130 or UTRAN 140 to be accessed when the GPRS subsystem 160 is replaced by the EPC subsystem 170. Additionally, the service network 120 may further include other functional entities, such as a Home Location Register (HLR) (not shown) which is a central database storing user-related and subscription-related information, and the invention is not limited thereto.

FIGS. 3A-3E are block diagrams of the UE 110 according to some embodiments of the invention. In FIGS. 3A-3E, the UE 110 comprises four antennas R1-R4 and a plurality of processing engines and the UE 110 is capable of Carrier Aggregation (CA), wherein the antennas are divided into two groups. The first group comprises antennas R1 and R2, and the second group comprises antennas R3 and R4. When the UE 110 is configured in more than one component carrier, the UE 110 may perform a normal Carrier Aggregation mechanism. That is to say, the service network 120 provides more than one component carriers (CCs) for the UE 110 (as shown in FIG. 1). In this case, the first group of antennas is configured for all processing engines which are configured for different component carriers and the second group of the antennas may be deactivated (idle mode).

Figure 3A:
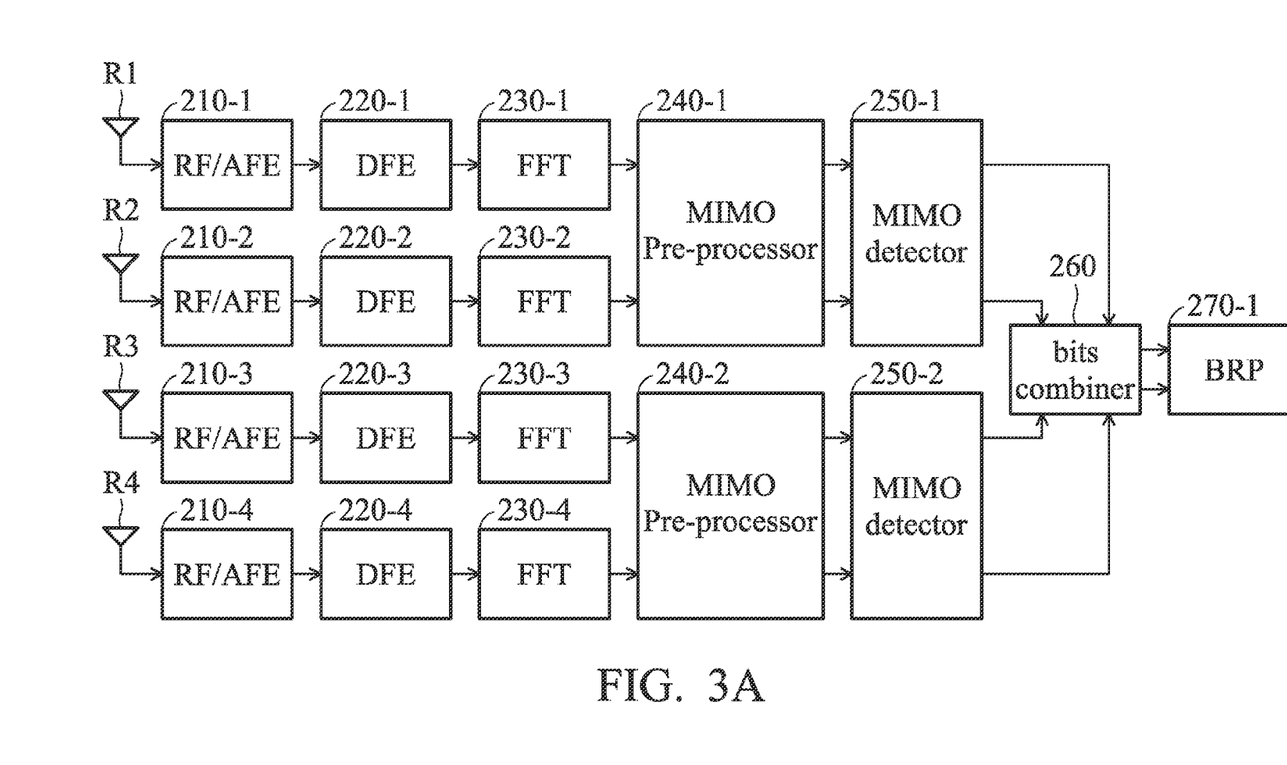
FIGS. 3A-3E are block diagrams of the UE 110 according to some embodiments of the invention.

In FIG. 3A, the processing engines comprise RF/AFE module 210-1~210-4, DFE module 220-1~220-4, FFT module 230-1~230-4, MIMO pre-processor 240-1~240-2, MIMO detector 250-1~250-2, bits combiner 260, and BRP module 270-1. The processing engines may be comprised of other elements which are comprised in the RF signal processing device 112 and the baseband signal processing device 111. The invention is not limited to what is shown in FIGS. 3A-3E.

When the UE 110 is just configured in a single component carrier (e.g. primary CC), i.e. the service network 120 only provides a single component carrier for the UE 110 for data transmission, the UE 110 may activate a second group of the antennas for operating the processing engines which are originally in idle mode. In this embodiment, the first group of antennas (R1 and R2) is configured for a first part of the processing engines (upper part) and the second group of antennas (R3 and R4) is configured for a second part of the processing engines (lower part). Note that, in a normal Carrier Aggregation mechanism, the second part of the processing engines is configured for another component carrier and configured with the first group of antennas. In the embodiments, the first part of the processing engines and the second part of the processing engines are configured for the same component carrier. In the FIG. 3A, the UE 110 may perform a bits-combining processing by the bits combiner 260 for combining the outputs of the MIMO detector 250-1 and 250-2 before a bit rate processing (BRP). Therefore, the UE 110 just needs one BRP module 270-1 and the other BRP module (as shown in FIG. 1) can be closed. Note that, if the UE 110 is converted to the normal Carrier Aggregation mechanism, the second group of antennas may be deactivated again and the outputs of the MIMO detector 250-1 and 250-2 are not combined by the bits combiner 260.

Figure 3B:
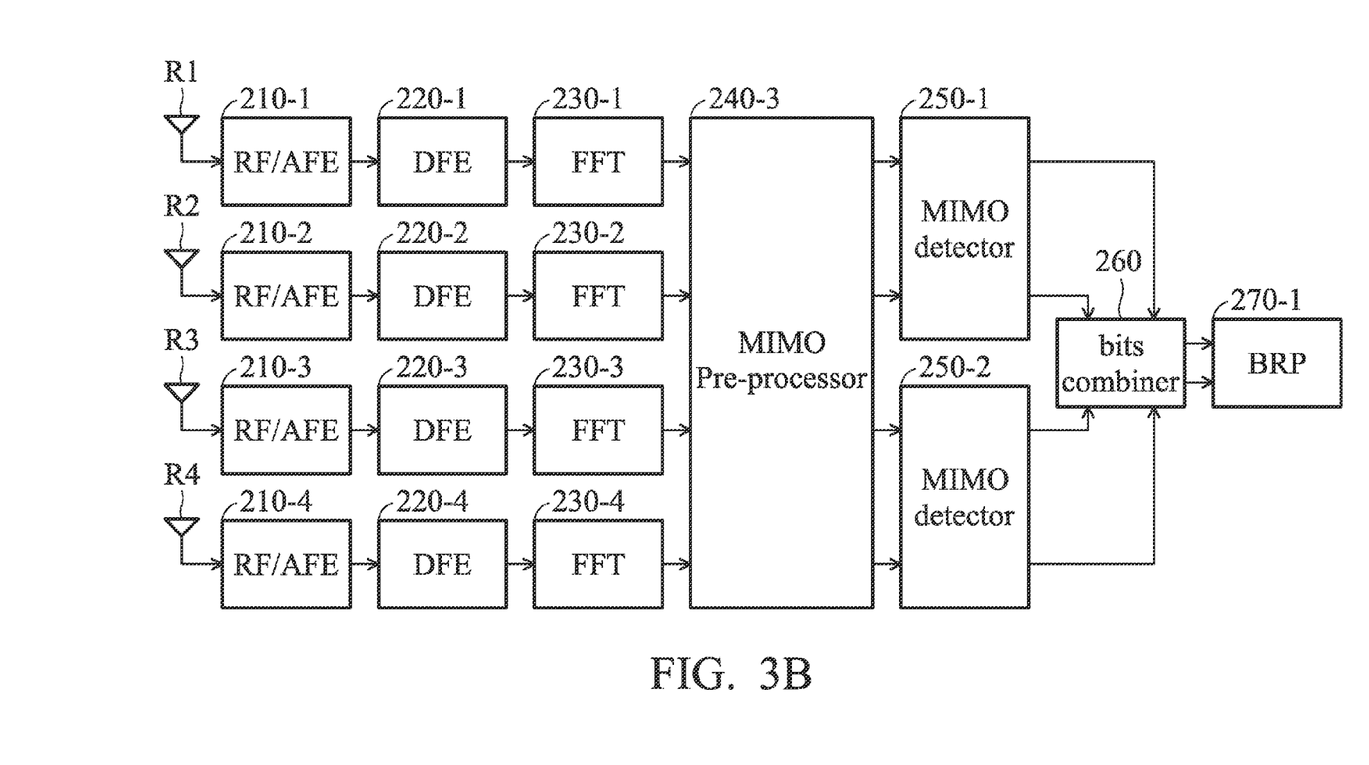

In FIG. 3B, the MIMO pre-processor 240-1~240-2 may be replaced by a MIMO pre-processor 240-3 which can process four branches joint processing. The MIMO pre-processor 240-1~240-2 only can process two branches processing. The MIMO pre-processor 240-1~240-2 may be replaced by the MIMO pre-processor 240-3 to achieve performance boost, because the MIMO pre-processor 240-3 may process the correlation relationship between the antennas of the first group and the second group simultaneously. Therefore the MIMO pre-processor 240-3 may optimize the outputs of the antennas of the first group and the second group.

Figure 3C:
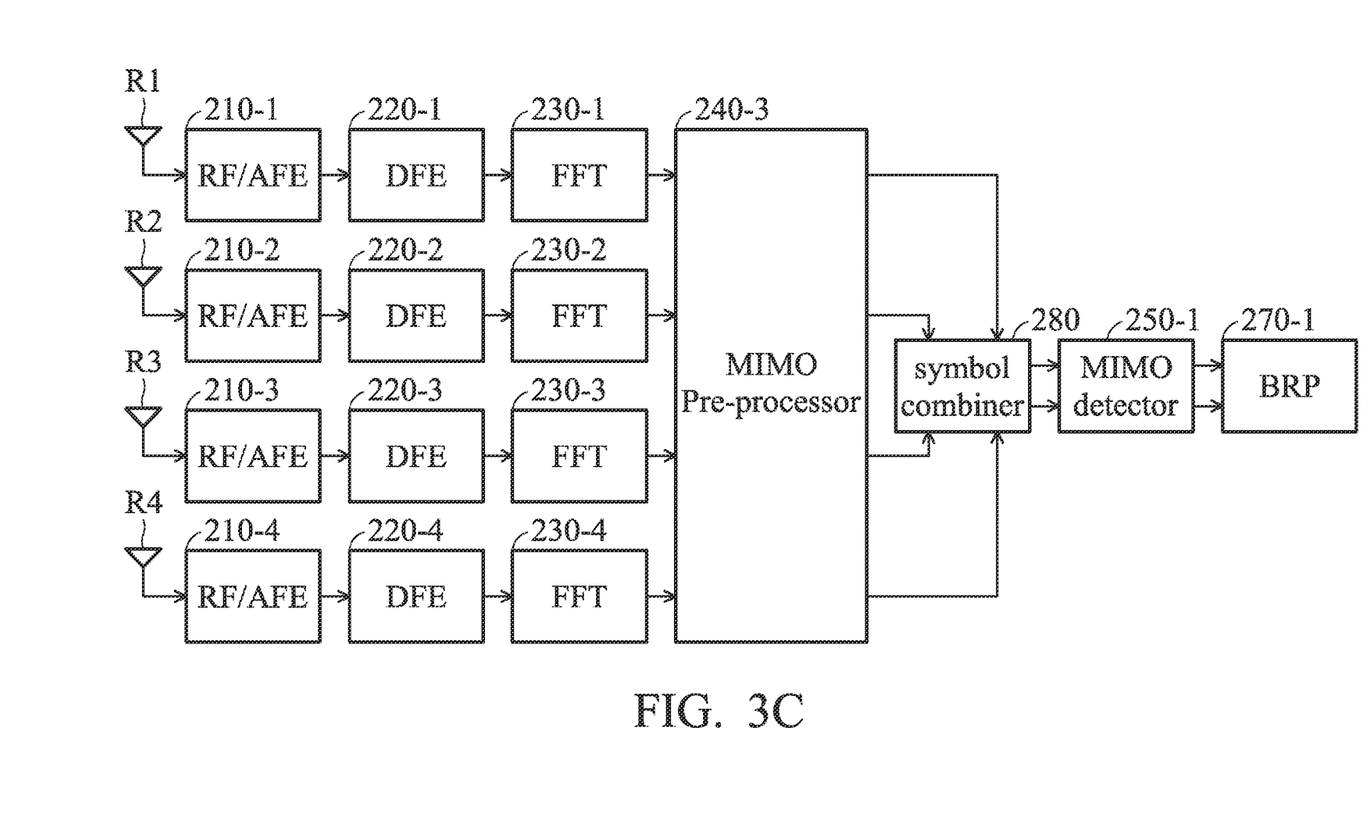

In FIG. 3C, the MIMO pre-processor 240-1~240-2 has been replaced by a MIMO pre-processor 240-3 which can process four branches joint processing and the UE 110 further comprises a symbol combiner 280 which is configured to perform a symbol-combining processing. The symbol combiner 280 receives the outputs of the MIMO pre-processor 240-3 for combining the outputs of the MIMO pre-processor 240-3 and then transmits the combined result to MIMO detector 250-1. Therefore, the UE 110 just needs one MIMO detector (MIMO detector 250-1) and the other MIMO detector can be closed. In FIG. 3C, as in FIGS. 3A-3B, the UE 110 also just needs one BRP module and the other BRP module can be closed.

Figure 3D:
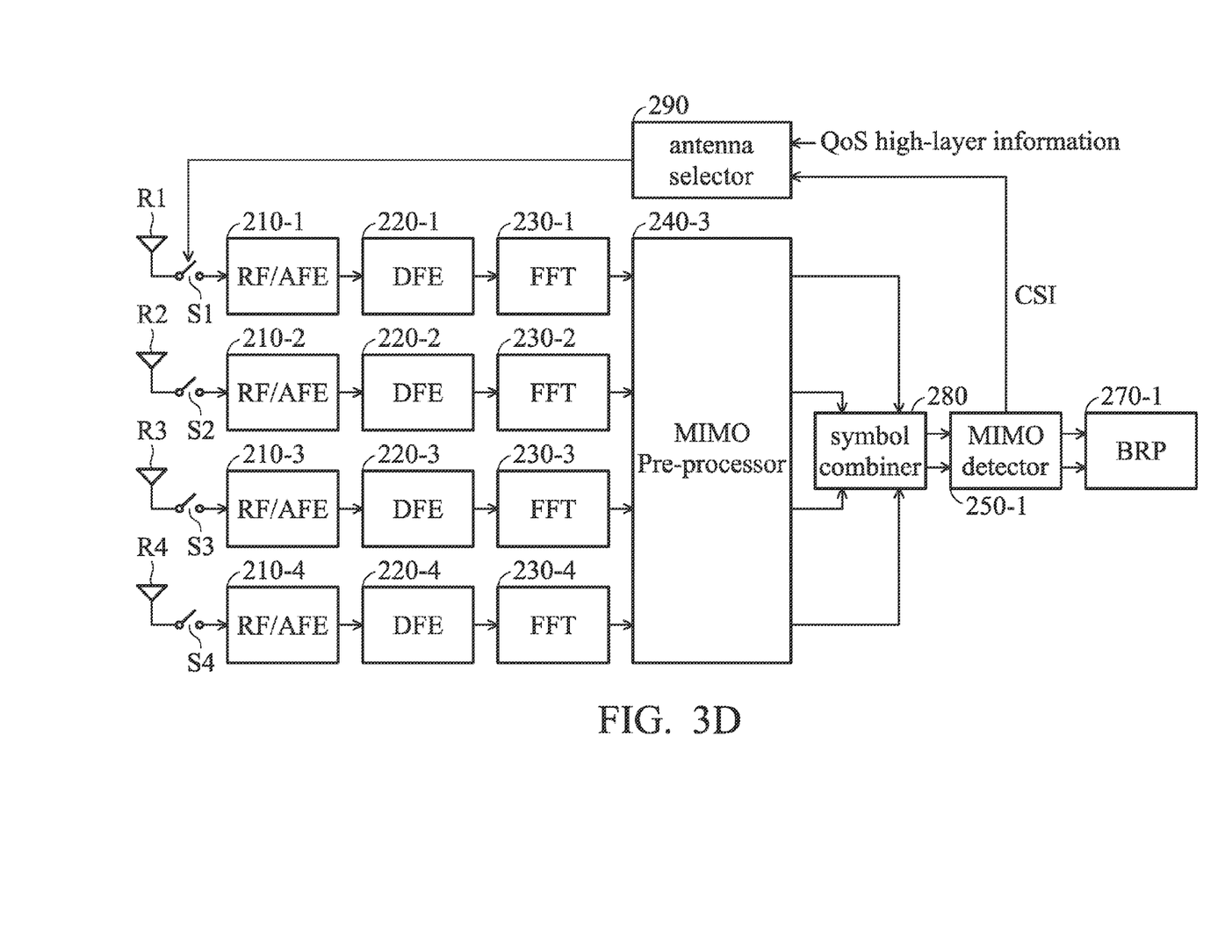

In FIG. 3D, the UE 110 further comprises an antenna selector 290 which is configured to select the antennas to activate according to indicators and the antennas R1-R4 are configured with switches S1-S4 respectively, wherein the switches S1-S4 are configured to turn on and turn off antennas R1-R4. The indicators comprise channel state information (CSI) provided from the MIMO detector 250-1 and quality of service (QoS) requirements and other high-layer (over the physical layer, such as Medium Access Control (MAC) layer, Radio Resource Control (RRC) layer and so on) information which are provided by the service network 120. The antenna selector 290 may dynamically decide which antennas should be turned on and which antennas should be closed according to the indicators. Therefore, if one antenna is turned off by the antenna selector 290, the engines in the branch corresponding to this antenna would be turned off, too. For example, if antenna R1 is closed by the antenna selector 290, the RF/AFE module 210-1, the DFE 220-1 and the FFT module 230-1 would be turned off for saving power.

Figure 3E:
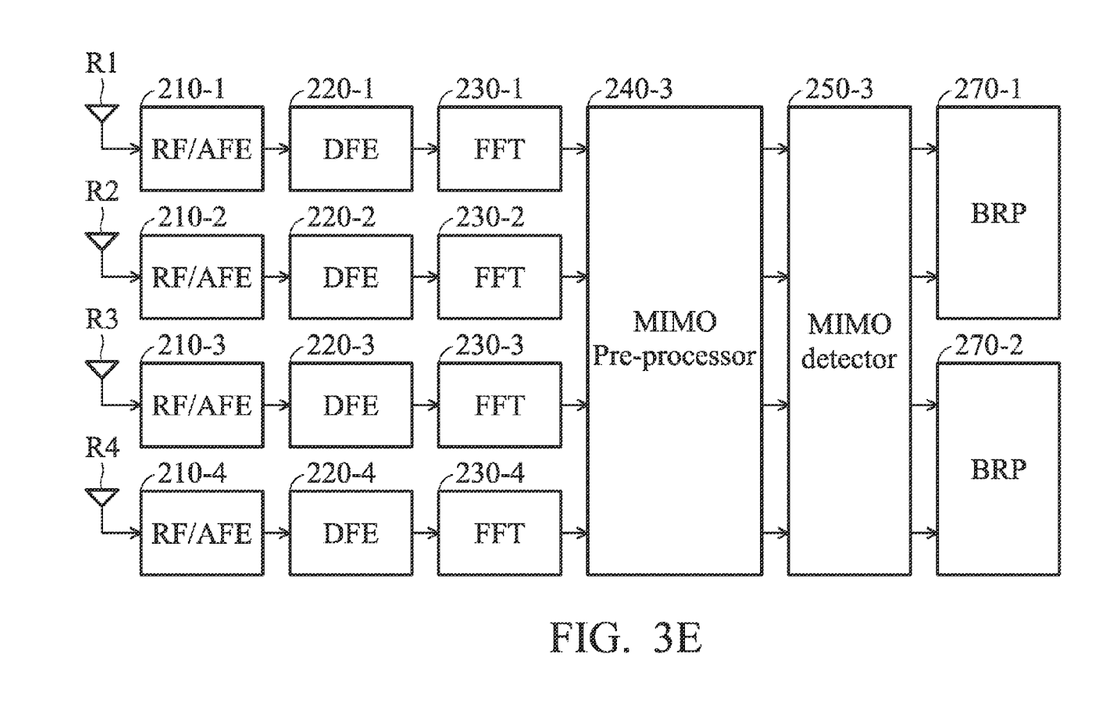

In FIG. 3E, the MIMO detector 250-1~250-2 may be replaced by a MIMO detector 250-3 for processing four MIMO layers transmission simultaneously. The MIMO detector 250-1~250-2 only supports two MIMO layers transmission. Therefore, if the UE 110 may process four MIMO layers transmission, the UE 110 may be configured to make the MIMO detector 250-3 to replace the MIMO detector 250-1 and the MIMO detector 250-2. In this embodiment, the UE 110 needs two BRP modules 270-1 and 270-2, because the MIMO detector 250-3 comprises four outputs.

In some embodiments, the UE 110 is only allowed to configure three antennas. The first group of antennas comprises two antennas and the second group of antennas comprises one antenna. Note that, in the FIGS. 3A-3E, the number of antennas may be three or four. However, the invention is not limited thereto. The number of antennas can also be more than four for different types of user equipment.

In addition, in the embodiments, if the UE 110 is converted to the normal Carrier Aggregation mechanism, the second group of antennas may be deactivated and the configuration of the processing engines may recover to the normal configuration as shown in FIG. 1. That is to say, the UE 110 can determine whether to activate the MIMO pre-processor 240-3, MIMO detector 250-3, bits combiner 260, symbol combiner 280, and/or antenna selector 290 dynamically according to the number of component carriers provided by the service network 120 and/or the service requirement of the UE 110.

In the prior art, when the service network 120 only provides a single component carrier for the UE 110, the processing engines configured for the other component carrier will be in an idle mode. The processing engines configured in an idle mode are not employed efficiently. In the invention, as shown in FIGS. 3A-3E, the UE 110 has configured additional antennas. The UE 110 can dynamically determine whether the second group of the antennas should be activated according to the number of component carriers provided by the service network 120. Therefore, the processing engines of the UE 110 may be employed more efficiently to avoid the resource consumption. In addition, when the service network 120 only provides one component carrier, the UE 110, which uses more antennas for transmitting and receiving in a component carrier, can obtain more diversity gain and performance enhancement, because antennas are added. The UE 110 can also select the antennas intelligently according to the different transmission requirements to avoid excessive power consumption (as shown in FIG. 3D).

Figure 4:
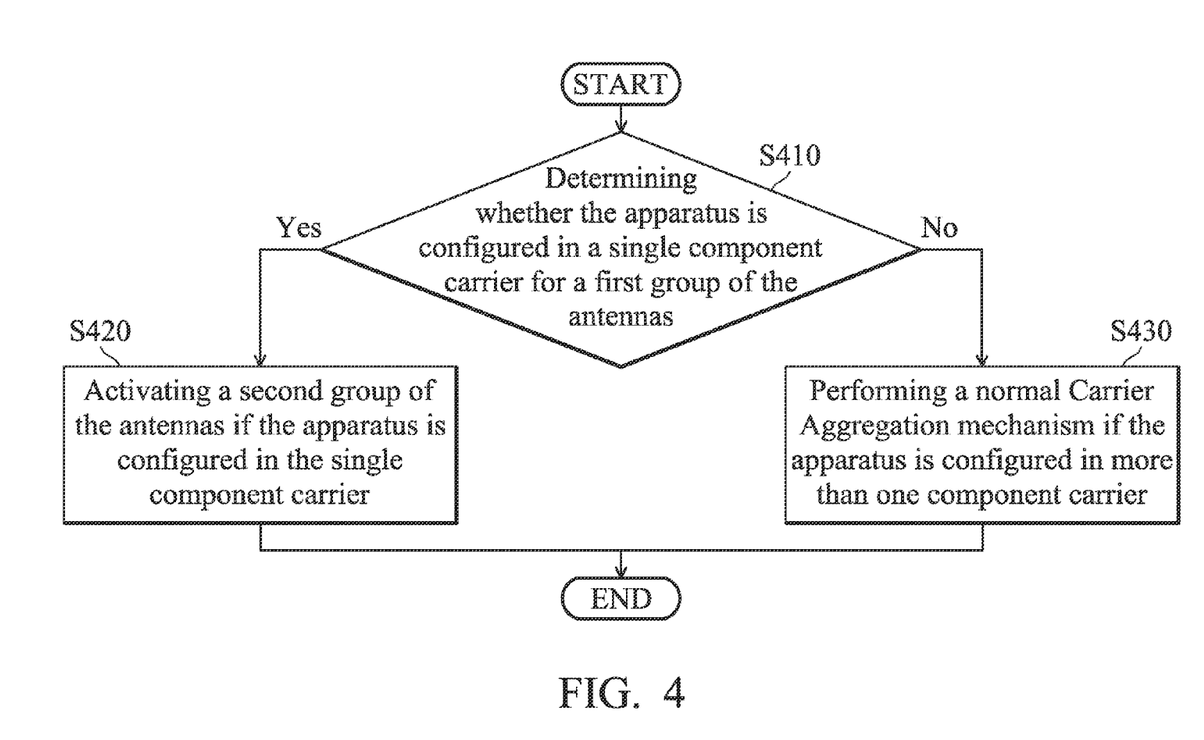
FIG. 4 is a flow chart illustrating the communications method according to an embodiment of the invention.

FIG. 4 is a flow chart illustrating the communications method according to an embodiment of the invention. The communications method is applied for an apparatus capable of Carrier Aggregation (CA) such as the UE 110, wherein the apparatus comprises a plurality of processing engines and antennas. The antennas are divided into two groups, a first group of antennas and a second group of antennas. Firstly, in step S410, it is determined whether the apparatus is configured in a single component carrier for a first group of the antennas. If the apparatus is configured in a single component carrier, the step S420 may be performed. In Step S420, a second group of antennas are activated if the apparatus is configured in the single component carrier. If the apparatus is configured in more than one component carrier, Step S430 may be performed. In Step S430, a normal Carrier Aggregation mechanism is performed, wherein in the normal Carrier Aggregation mechanism, the first group of the antennas is configured for all processing engines and the second group of the antennas is closed. Therefore, in the communications method, the second group of the antennas can be dynamically activated according to the number of component carriers, and the engines of the apparatus can be operated efficiently to avoid excessive resource consumption.

In an embodiment, the first group of antennas is configured for a first part of the processing engines and the second group of antennas is configured for a second part of the processing engines, if the apparatus is configured in the single component carrier. In addition, when the apparatus is converted to the normal Carrier Aggregation mechanism again, the second group of antennas may be deactivated again, and the second part of the processing engines is re-configured with the first group of antennas.

In some embodiments, the communications method further comprises the step of performing a bits-combining processing by a bits combiner before performing a bit rate processing (BRP), wherein in these embodiments, the first part of the processing engines and the second part of the processing engines may share a MIMO pre-processor for performance boost.

In some embodiments, the communications method further comprises the step of performing a symbol combining processing, wherein in these embodiments, the first part of the processing engines and the second part of the processing engines share a MIMO pre-processor and the apparatus only uses one MIMO detector.

In some embodiments, the communications method further comprises the step of selecting the antennas to activate by an antenna selector according to indicators. The indicators comprise channel state information (CSI), quality of service (QoS) requirement and other high layer information. In these embodiments, the apparatus may dynamically decide which antennas should be turned on and which antennas should be turned off by the antenna selector according to the indicators to avoid the power consumption.

The steps of the method described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such that the processor can read information (e.g., code) from and write information to the storage medium. A sample storage medium may be integral to the processor. The processor and the storage medium may reside in an ASIC. The ASIC may reside in user equipment. Alternatively, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

The above paragraphs describe many aspects. Obviously, the teaching of the invention can be accomplished by many methods, and any specific configurations or functions in the disclosed embodiments only present a representative condition. Those who are skilled in this technology can understand that all of the disclosed aspects in the invention can be applied independently or be incorporated.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A communications method, for an apparatus capable of Carrier Aggregation (CA), wherein the apparatus comprises a plurality of processing engines and antennas, comprising:
    determining whether the apparatus is configured in a single component carrier for a first group of the antennas;
    activating a second group of the antennas when the apparatus is configured in the single component carrier, wherein the first group of antennas are configured for a first part of the processing engines and the second group of antennas are configured for a second part of the processing engines when the apparatus is configured in the single component carrier, wherein the first part of the processing engines and the second part of the processing engines share a MIMO pre-processor;
    performing a symbol combining processing, wherein the first part of the processing engines and the second part of the processing engines share a MIMO pre-processor, wherein the first part of the processing engines and the second part of the processing engines share a MIMO pre-processor and a MIMO detector, and
    using an antenna selector, connected with the MIMO detector, to select the antennas to activate according to indicators from the MIMO detector.

2. The communications method of claim 1, further comprising:
    performing a normal Carrier Aggregation mechanism when the apparatus is configured in more than one component carrier.

3. The communications method of claim 2, wherein in the normal Carrier Aggregation mechanism, the first group of the antennas is configured for all processing engines.

4. The communications method of claim 1, further comprising:
    performing a bits combining processing before a bit rate processing (BRP).

5. The communications method of claim 1, further comprising:
selecting the antennas to activate according to indicators.

6. The communications method of claim 5, wherein the indicators comprise channel state information (CSI) and quality of service (QoS) requirement.

7. The communications method of claim 1, further comprise:
deactivating the second group of antennas when the apparatus is converted to a normal Carrier Aggregation mechanism; and
performing the normal Carrier Aggregation mechanism.

8. The communications method of claim 1, wherein the first group of antennas comprises two antennas and the second group of antennas comprises one or two antennas.

9. A communications apparatus capable of Carrier Aggregation (CA), comprising:
a plurality of processing engines, comprised in an RF signal processing device and connected with a plurality of processing antennas;
a processor configured to detect whether the communications apparatus is configured in a single component carrier,
wherein the antennas are divided into a first group of the antennas and a second group of the antennas, wherein the first group of antennas are configured for a first part of the processing engines and the second group of antennas are configured for a second part of the processing engines when the apparatus is configured in the single component carrier,
wherein the processor activates the second group of the antennas when the apparatus is configured in the single component carrier;
a MIMO pre-processor, wherein the first part of the processing engines and the second part of the processing engines share a MIMO pre-processor;
a symbol combiner, connected with the MIMO pre-processor and configured to perform a symbol combining processing for outputs of the MIMO pre-processor;
a MIMO detector, connected with the symbol combiner; and
an antenna selector, connected with the MIMO detector and configured to select the antennas to activate according to indicators from the MIMO detector.

10. The communications apparatus of claim 9, wherein a normal Carrier Aggregation mechanism is performed by the processor when the communications apparatus is configured in more than one component carrier.

11. The communications apparatus of claim 10, wherein in the normal Carrier Aggregation mechanism, the first group of the antennas is configured for all processing engines.

12. The communications apparatus of claim 9, further comprising:
a first MIMO detector, corresponded to the first group of the antennas;
a second MIMO detector, corresponded to the second group of the antennas; and
a bits combiner, connected with the first MIMO detector and the second MIMO detector and configured to perform a bits combining processing for outputs of the first MIMO detector and the second MIMO detector before a bit rate processing (BRP).

13. The communications apparatus of claim 12, further comprising:
a MIMO pre-processor, wherein the first part of the processing engines and the second part of the processing engines share the MIMO pre-processor.

14. The communications apparatus of claim 9, wherein the indicators comprise channel state information (CSI) and quality of service (QoS) requirement.

15. The communications apparatus of claim 9, further comprising:
a MIMO pre-processor; and
a MIMO detector, wherein the first part of the processing engines and the second part of the processing engines share a MIMO pre-processor and a MIMO detector.

16. The communications apparatus of claim 9, wherein the second group of antennas is deactivated when the apparatus is converted to a normal Carrier Aggregation mechanism; and the normal Carrier Aggregation mechanism is performed.

17. The communications apparatus of claim 9, wherein the first group of antennas comprises two antennas and the second group of antennas comprises one or two antennas.

* * * * *